(12) United States Patent
Rorrer

(10) Patent No.: US 12,312,761 B2
(45) Date of Patent: May 27, 2025

(54) ALTERNATIVE USES FOR WIND TURBINE BLADES

(71) Applicant: The Regents of the University of Colorado, a body corporate, Denver, CO (US)

(72) Inventor: Ronald A. L. Rorrer, Highlands Ranch, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 131 days.

(21) Appl. No.: 18/007,493

(22) PCT Filed: Aug. 2, 2021

(86) PCT No.: PCT/US2021/044187
§ 371 (c)(1),
(2) Date: Jan. 31, 2023

(87) PCT Pub. No.: WO2022/026951
PCT Pub. Date: Feb. 3, 2022

(65) Prior Publication Data
US 2023/0287647 A1    Sep. 14, 2023

Related U.S. Application Data

(60) Provisional application No. 63/059,671, filed on Jul. 31, 2020.

(51) Int. Cl.
*E02D 17/18*    (2006.01)
*E02D 17/20*    (2006.01)
*E02D 29/02*    (2006.01)

(52) U.S. Cl.
CPC ......... *E02D 29/0266* (2013.01); *E02D 17/20* (2013.01); *E02D 2600/30* (2013.01)

(58) Field of Classification Search
CPC ....... F03D 80/00; E02D 17/18; E02D 17/205; E02D 29/0266; E02D 17/20;
(Continued)

(56) References Cited

U.S. PATENT DOCUMENTS 2,801,069 A * 7/1957 Campbell ............... F03B 13/08
  415/68
6,604,891 B1    8/2003 Wurster
(Continued)

FOREIGN PATENT DOCUMENTS

KR    2016-0116601 A    10/2016

OTHER PUBLICATIONS

Busschen; "Industrial re-use of composites"; Jun. 2020; URL: https://www.windesheim.nl/getmedia/d6366af2-6025-4411-a223-74f0a271ae9c/Article-Reinforced-Plastics-2020.pdf (Year: 2020).*
(Continued)

*Primary Examiner* — Edwin J Toledo-Duran

(57) ABSTRACT

The systems and methods disclosed herein provide inventive means for repurposing wind turbine blades. In an embodiment, a derivative of a decommissioned wind turbine blade may be positioned and anchored for use in soil retention installations (e.g., slope stabilization, land building, etc.). In another embodiment, a derivative of a decommissioned wind turbine blade may be implemented in infrastructure installations (e.g., bridge decking). In yet another embodiment, a derivative of a decommissioned wind turbine blade may be positioned and anchored to mitigate snow drifts (e.g., as a snow break). Additional uses of wind turbine blades are considered and disclosed herein.

20 Claims, 13 Drawing Sheets

(58) Field of Classification Search
CPC ............... E02D 2600/30; E02D 27/425; B29L 2031/085; F05B 2230/60; F05B 2240/302; F05B 2280/6003; Y02W 30/50; Y10T 29/49755; Y02E 10/72; Y02P 70/50; E01B 2/00; E01C 3/003; E01C 3/006; Y02B 10/30
See application file for complete search history.

(56) References Cited

U.S. PATENT DOCUMENTS

| | | |
|---|---|---|
| 2012/0073229 A1 | 3/2012 | Castonguay et al. |
| 2017/0138013 A1 | 5/2017 | Woolbright et al. |
| 2019/0066062 A1* | 2/2019 | Lilly ..................... G06Q 10/00 |
| 2019/0070680 A1* | 3/2019 | Lilly ................. B23D 57/0092 |
| 2020/0061725 A1* | 2/2020 | Lilly ................. B23D 57/0053 |
| 2022/0065221 A1* | 3/2022 | Duda .................... E02D 17/205 |

OTHER PUBLICATIONS

International Application No. PCT/US2021/044187, International Search Report, Written Opinion, 10 pages, Dec. 15, 2021.
Life & Soul Magazine, "Wikado Playground: Kids Playground Built From Discarded Wind Turbine Parts," 5 pages, Nov. 12, 2017.
Martin, Chris, "Wind Turbine Blades Can't Be Recycled, So They're Piling Up In Landfills," Bloomberg L. P., 6 pages, Feb. 5, 2020.

* cited by examiner

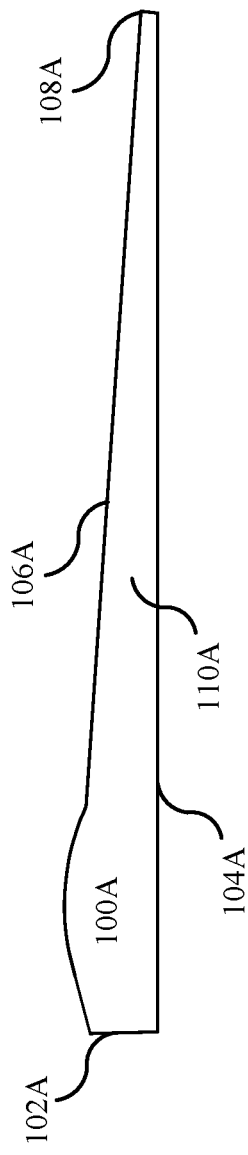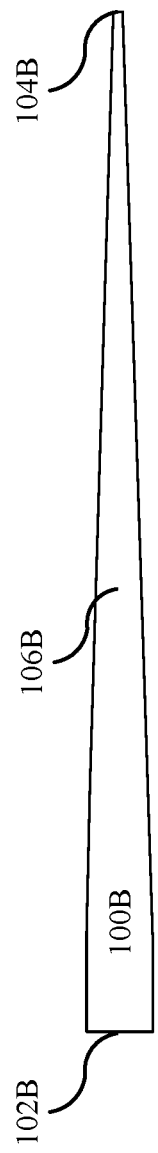
FIGURE 1A
FIGURE 1B

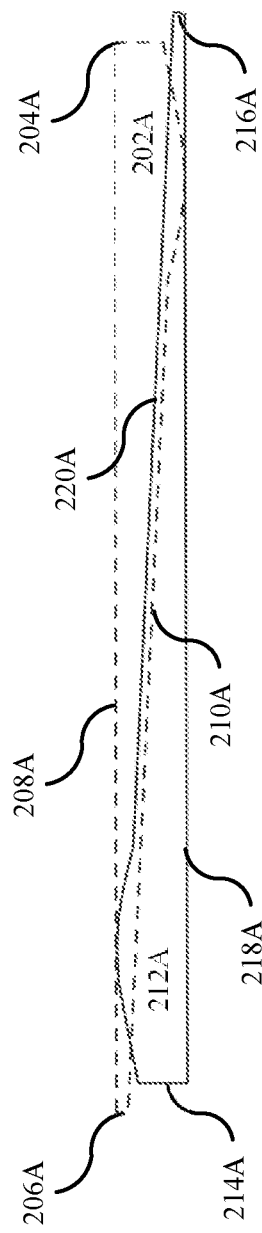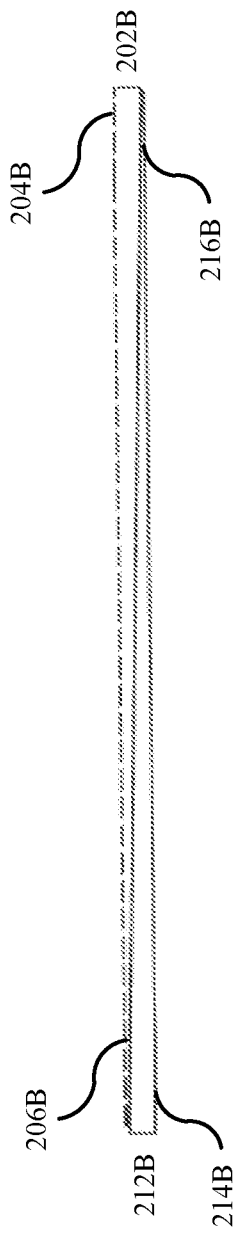
FIGURE 2A
FIGURE 2B

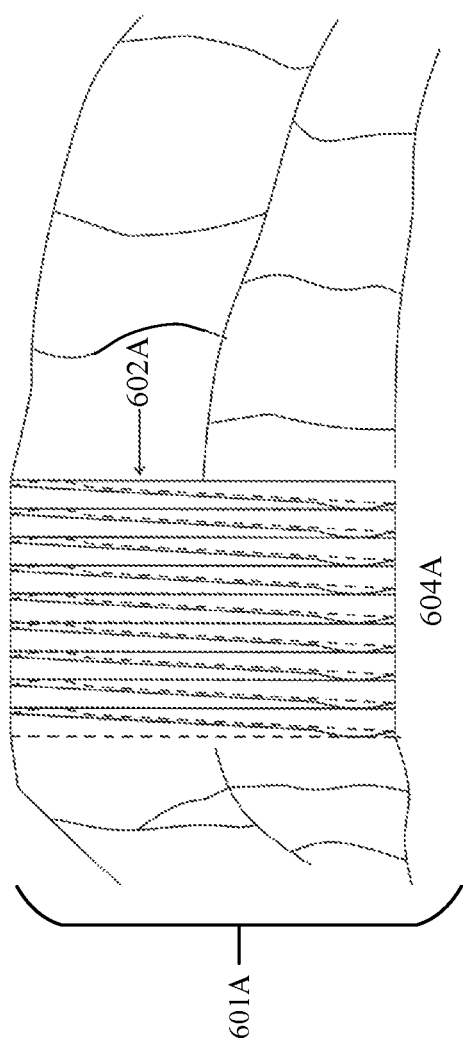
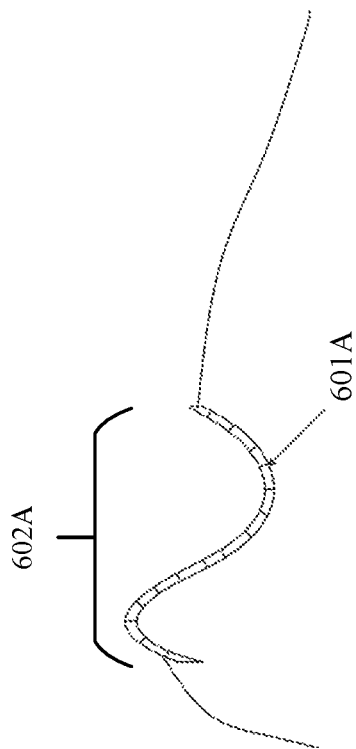
FIGURE 6A
FIGURE 6B

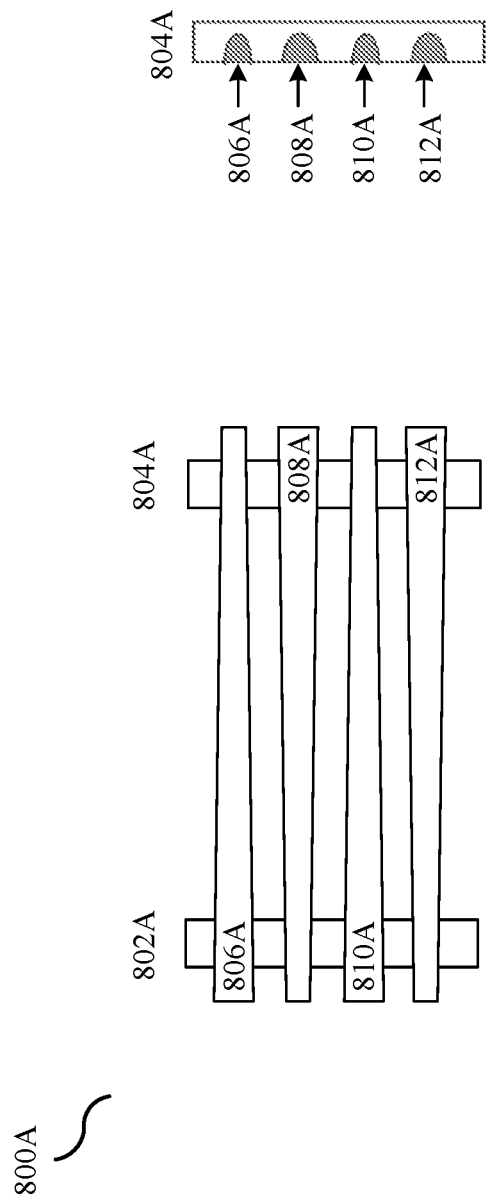

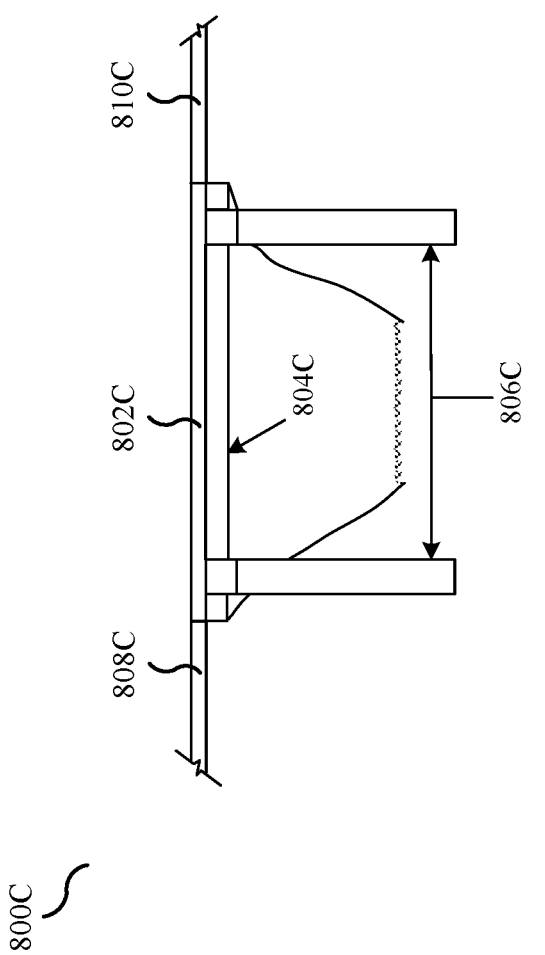

ALTERNATIVE USES FOR WIND TURBINE BLADES

CROSS-REFERENCE TO RELATED APPLICATIONS

This application claims priority to and benefit from U.S. Provisional Application No. 63/059,671, filed Jul. 31, 2020, titled "Alternative Uses for Wind Turbine Blades," which is expressly incorporated herein by reference.

TECHNICAL FIELD

Aspects of the disclosure are related to the field of wind turbines, and in particular, to using wind turbine blades in soil retention applications.

BACKGROUND

The majority of wind turbines convert wind energy into mechanical energy via multiple bladed propellers rotating around a horizontal axis. These wind turbine blades have a useful lifespan for energy production that ranges from 10 to 25 years. However, they are often removed well prior to the end of their structural lifespan, e.g., due to repowering considerations. As a result, thousands of wind turbine blades are disposed of annually with a majority being sent to landfills.

Built to withstand hurricane-force winds, the composite material that gives a wind turbine blade its strength is generally not easy to recycle or repurpose. Furthermore, a typical land-based wind turbine blade can have lengths of over 170 feet with some offshore wind turbines having blades of over 350 feet long. As a result, disposal of wind turbine blades via landfilling, burning, and breaking down chemically, thermally, and/or mechanically can be costly from the perspectives of land use management, energy requirements to breakdown and/or burn the composite material, and the like.

One existing method of recycling wind turbine blades generally include shredding the composite material of the wind turbine blade into small particles to replace raw materials for use in the manufacturing of cement and/or other composite materials. However, these methods require significant amounts of energy and result in the destruction of the structural integrity of the turbine blade's composite material.

Overview

This Overview is provided to introduce a selection of concepts in a simplified form that are further described below in the Detailed Description section. This Overview is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems and methods for alternative uses of wind turbine blades. In an embodiment, a derivative of a decommissioned wind turbine blade may be implemented as a means of soil stabilization by placing the derivative of the turbine blade against an earthen slope in a direction that prevents lateral flow of earthen material, and anchoring the derivative of the turbine blade to the earthen slope. In another embodiment, a derivative of a decommissioned wind turbine blade may be implemented in infrastructure installations (e.g., bridge decking). In yet another embodiment, an apparatus for mitigating wind flows and/or snow drifts may be constructed by coping a plurality of decommissioned wind turbine blade derivatives and coupling the plurality of decommissioned wind turbine blade derivatives to a support tower.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 1A illustrates a side view of a wind turbine blade.

FIG. 1B illustrates a leading edge view of a wind turbine blade.

FIG. 2A illustrates a wind turbine blade arrangement in an implementation.

FIG. 2B illustrates a wind turbine blade arrangement in an implementation.

FIG. 6A illustrates a wind turbine blade arrangement in an implementation.

FIG. 6B illustrates a wind turbine blade arrangement in an implementation.

FIG. 8A illustrates a wind turbine blade in an implementation.

FIG. 8B illustrates a wind turbine blade in an implementation.

FIG. 8C illustrates a wind turbine blade in an implementation.

DETAILED DESCRIPTION

Figure 3A:
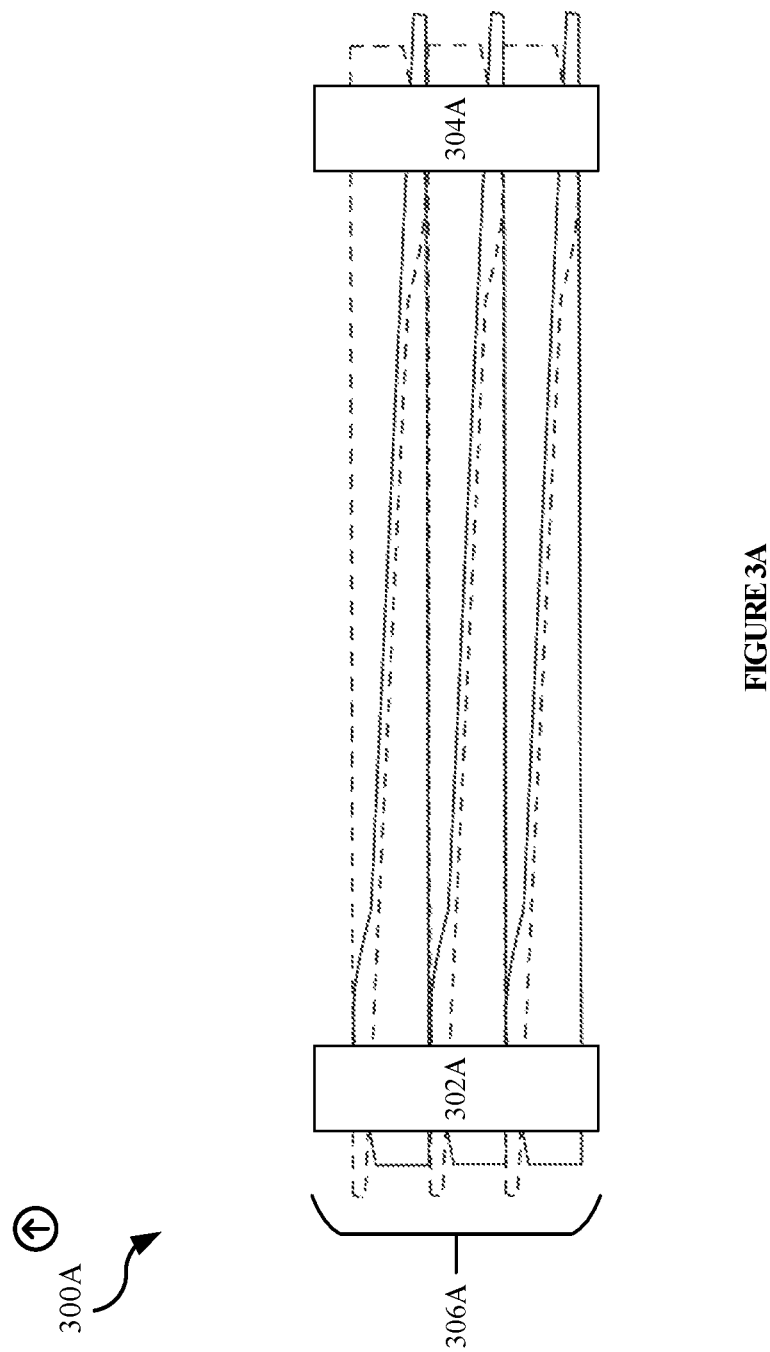
FIG. 3A illustrates a wind turbine blade arrangement in an implementation.

A method, system, and apparatus for alternative uses for wind turbine blades are disclosed herein. A wind turbine blade is a large and strong structural component. The blade of a wind turbine may be constructed of composites, wood, fiberglass, adhesives, epoxy, thermoset resin, thermoplastic resin, bond exchange reaction resin, carbon fiber, and/or and the like. Structural adhesives may also be used to hold the layers of the blade together. The concepts presented herein apply regardless of the material used to construct the wind turbine blade.

Instead of sacrificing the existing strength of a wind turbine blade by discarding or separating its composite components, the blade can be reused in other applications that may rely on the blade's static strength and/or long length. For example, wind turbine blades may be installed as soil retention mechanisms in civil engineering applications e.g., as retaining walls, reinforcement of earthen dams, reinforcement of earthen slopes tending to failure, and the like. Wind turbine blades may be installed along steep embankments, roadside slopes, shoreline slopes, residential retaining walls, etc. In some embodiments, wind turbine blades may be cut and filled with soil and/or growing medium to promote growth of vegetation e.g., in retaining wall installations.

Additionally, wind turbine blades may be used to mitigate the flow of snow and/or wind. Wind turbines are typically constructed in high wind areas, and local installation of turbine blades as a snow and/or wind break could provide the additional benefit of cutting transportation costs.

Alternatively, wind turbine blades may be implemented as conduit for electrical, telecommunication, and/or other utility installations as well as provide components for roadway and/or bridge installations, e.g., as bridge decking. The composite material of the wind turbine blades may be suitable for these installations because composite material provides structural support and is generally non-conductive, rot resistant, rust resistant, and flame retardant.

Turning now to the figures, FIG. 1A illustrates a side view of wind turbine blade 100A. Wind turbine blade 100A comprises root end 102A, leading edge 104A, trailing edge 106A, tip end 108A, and mid-span 110A located between root end 102A and tip end 108A. Wind turbine blade 100A may taper and/or twist from root end 102A to tip end 108A. Wind turbine blade 100A may also taper and/or twist from leading edge 104A to trailing edge 106A. Root end 102A may be cylindrical in shape and/or may comprise bolting features for fastening root end 102A to a wind turbine tower (not shown).

FIG. 1B illustrates a leading edge view of wind turbine blade 100B. Wind turbine blade 100B comprises a root end 102B and a tip end 104B. Wind turbine blade 100B comprises mid-span 106B located between root end 102B and tip end 104B. Wind turbine blade 100B may taper and/or twist from root end 102B to tip end 108B.

FIG. 2A illustrates a stacked wind turbine blade arrangement in an implementation where two or more wind turbine blades, e.g., blades 202A and 212A, are stacked along their side profiles (e.g., leading edges and/or trailing edges). Stacking turbine blades along their side profiles can maximize slope coverage, e.g., by requiring the fewest number of blades per vertical square foot of coverage. Blade 202A comprises root end 204A, tip end 206A, leading edge 208A, and trailing edge 210A. Blade 212A comprises root end 214A, tip end 216A, leading edge 218A, and trailing edge 220A. Though FIG. 2A depicts trailing edge 210A stacked atop trailing edge 220A, any and all combinations of stacking blades 202A and 212A along their respective side profiles (e.g., leading edge to trailing edge, leading edge to leading edge, etc.) is possible and contemplated herein.

In an embodiment, blades 202A and 212A are coped to obtain a best fit. In another embodiment, a filler and/or chinking material may be placed between blades 202A and 212A (e.g., along trailing edges 210A and 220A). A combination of coping and filler and/or chinking material may also be implemented. Blades 202A and 212A may also be anchored individually or together. The terms anchor, anchored, and/or anchoring, as used herein may describe a mechanical means (e.g., fabric, nail, cable, rod, tendon, bolt, masonry structure, etc.) of securing an object (e.g., a derivative of a wind turbine blade).

Epoxy made with blade fragments may be used as chinking and/or filler material. An epoxy made with blade fragments may have similar characteristics as the installed blades, e.g., thermal dynamic and degradation characteristics.

FIG. 2B illustrates a stacked wind turbine blade arrangement in an implementation where two or more wind turbine blades, e.g., blades 202B and 212B, are stacked along their midspans. Stacking blades along their midspans can provide a greater moment of inertia. Additionally, stacking blades along their midspans can maximize the number of blades installed at a single installation, e.g., by requiring the greatest number of blades per vertical square foot of coverage. As such, stacking blades along their midspans may provide an additional benefit of repurposing more blades at a single location than can be repurposed in other installation configurations.

Blade 202B comprises root end 204B and tip end 206B. Blade 212B comprises root end 214B and tip end 216B. In an embodiment, blades 202B and 212B are coped to obtain a best fit. In another embodiment, a filler and/or chinking material may be placed between blades 202B and 212B. In other embodiments, a combination of coping and use of a chinking and/or filler material may be implemented. Blades 202B and 212B may also be anchored individually or together.

In an embodiment, blades 202B and 212B are connected together by a fastening means, e.g., a fastening system, a cable (synthetic or metal), fabric, support tower, anchor, etc.

A combination of stacking turbine blades along their side profiles and along their midspans (not shown) is a possible installation arrangement this contemplated herein.

FIG. 3A illustrates a wind turbine blade support system 300A in an implementation whereby one or more blades are anchored in a horizontal position using support structures, e.g., support towers 302A and 304A. Support structures, e.g., towers 302A and 304A, may be placed near the root ends, tip ends, and/or anywhere within the mid-span of the blade. In an implementation, support system 300A may be constructed in the absence of soil or other retention material, e.g., when constructing a slope behind the support system, when creating land masses in water, when extending land masses to form or exaggerate a peninsula or plateau, etc. In another implementation, support system 300A may be installed to stabilize existing materials, e.g., an existing slope, earthen dam, etc.

In an implementation, support towers 302A and 304A may be constructed of concrete, composite material, cabling, wood, fabric, and the like. In another implementation, supports towers 302A and 304A may comprise derivatives of wind turbine blades, e.g., root end sections, structural mixes comprising blade particles, and the like. Blades 306A may be keyed into support structures 302 and 304 or otherwise anchored to support towers 302A and 304A.

Though FIG. 3A illustrates two support structures, any number of support structures and combination of structural materials is possible and contemplated herein.

Figure 3B:
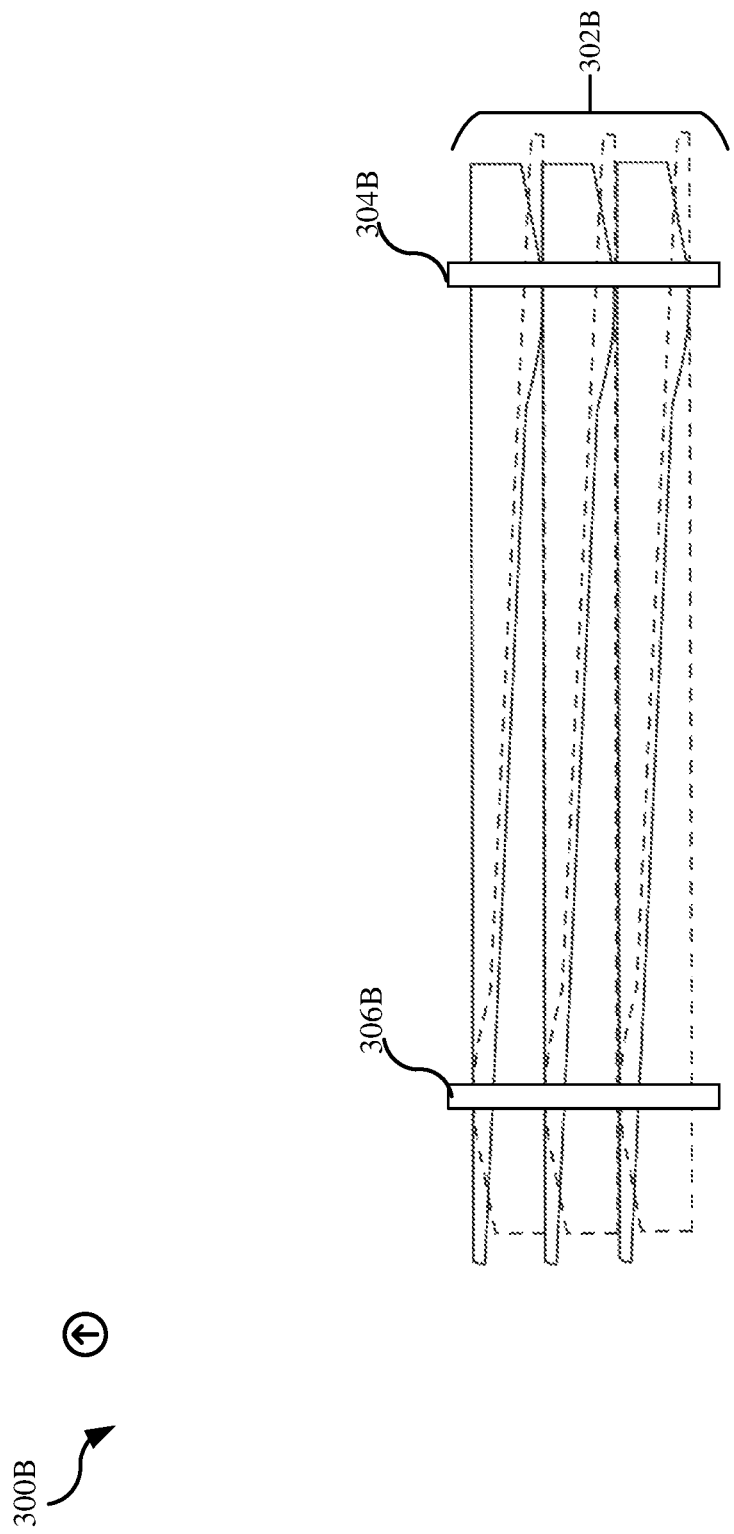
FIG. 3B illustrates a wind turbine blade arrangement in an implementation.

FIG. 3B illustrates a wind turbine blade support system 300B in an implementation whereby one or more blades, e.g., blades 302B are anchored in a vertical position using support structures, e.g., support towers 304B and 306B. Support structures, e.g., towers 304B and 306B, may be placed near the root ends, tip ends, and/or anywhere within the mid-span of the blade. In an implementation, support system 300B may be constructed in the absence of soil or other retention material, e.g., when constructing a slope behind the support system, when creating land masses in water, when extending land masses to form or exaggerate a peninsula or plateau, etc. In another implementation, support system 300B may be installed to stabilize existing materials, e.g., an existing slope, earthen dam, etc.

In an implementation, support towers 304B and 306B may be constructed of concrete, composite material, cabling, wood, fabric, and the like. In another implementation, supports towers 304B and 306B may comprise derivatives of wind turbine blades, e.g., root end sections, structural mixes comprising blade particles, and the like. Blades 302B may be keyed into support structures 304B and 306B or otherwise anchored to support structures 304B and 306B.

Though FIG. 3B illustrates two support structures, any number of support structures and combination of structural materials is possible and contemplated herein.

Figure 4:
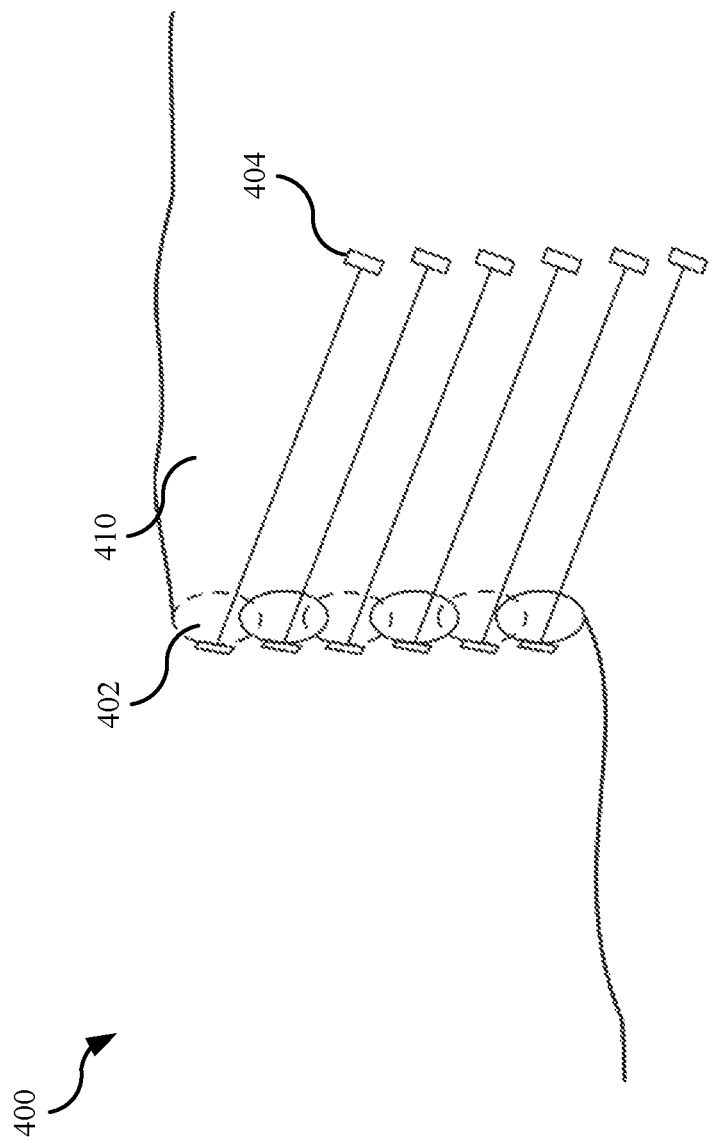
FIG. 4 illustrates a wind turbine blade arrangement in an implementation.

FIG. 4 illustrates a wind turbine blade support system 400 in an implementation whereby one or more turbine blade derivatives, e.g., blade 402 are secured using anchors, e.g., anchor 404. Turbine blade derivatives may comprise whole wind turbine blades and/or portions of wind turbine blades including one or more root ends, tip ends, trailing edges, and/or leading edges. Blade 402 may be placed in a horizontal, vertical, or angled orientation against earthen material 410.

Anchor 404 may comprise any material suitable for securing blade support system 400 against the lateral loads of earthen material 410. For example, anchor 404 may include tieback anchors, earth anchors, spiral anchors, concrete anchors, and the like. Anchors may rely on tension strength and/or shear-friction with the earthen material 410 to secure the position of blade 402.

Though FIG. 4 illustrates one anchor per turbine blade derivative, e.g., blade 402, any number of anchors and combination of anchor types is possible and considered herein.

Figure 5:
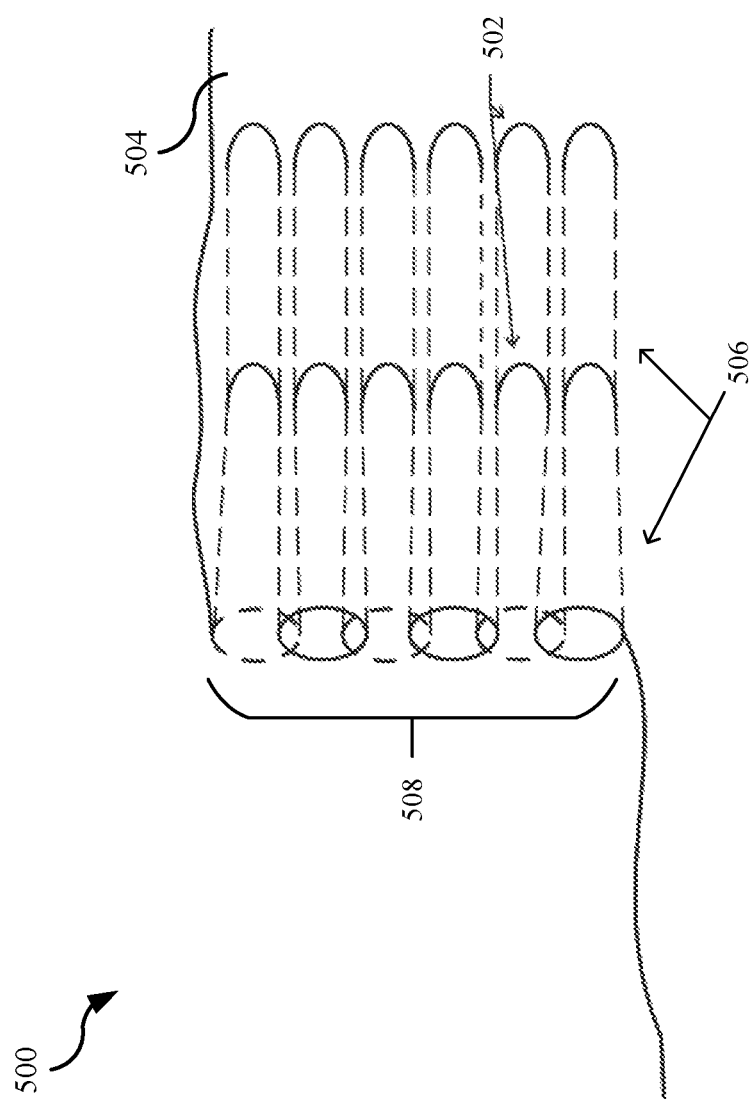
FIG. 5 illustrates a wind turbine blade arrangement in an implementation.

FIG. 5 illustrates a wind turbine blade support system 500 in an implementation whereby one or more wind turbine blade derivatives, e.g., turbine blades 502, are embedded in an earthen bank, e.g., earthen material 504. For example, a failing slope may be excavated and/or otherwise cutback to expose a portion of earthen material 504 having an optimal degree of soil compaction. One or more wind turbine blade derivatives, e.g., turbine blades 502, may be anchored at the face of the excavation. Soil and/or other suitable material, e.g., backfill 506, may be backfilled and/or otherwise positioned proximate to the turbine blades 502. Turbine blades 502 may be embedded in earthen material 504 individually and/or as connected array of turbine blade derivatives.

In an implementation, an additional grouping of wind turbine blade derivatives, e.g., blades 502, may be installed at a distance from the blade derivatives installed at the face of the excavation. Additional backfill, e.g., backfill 506, may be positioned proximate to the additional grouping of wind turbine blade derivatives to extend earthen material 504 to a desired length.

In an embodiment, turbine blade derivatives 508 may be anchored along the face of the slope into earthen material 504. Turbine blade derivatives 508 may be installed vertically, horizontally, and/or angled with respect to the horizon.

In an embodiment, turbine blade derivatives 508 may be installed as individual blade derivatives, connected blade derivatives, or some combination thereof.

Installing wind turbine blades in a horizontal manner may not be possible or feasible, e.g., along vertical or undulating slopes. To provide support for vertical and/or undulating slopes, wind turbine blades may be installed in a vertical orientation. For example, FIG. 6A illustrates a wind turbine blade support system installed vertically along a vertical and/or undulating slope, e.g., slope 601A. Blade derivatives 602A may be oriented vertically and/or positioned at an angle between zero and 90 degrees. Blade derivatives 602A may be anchored to slope 601A, keyed into existing ground surface 604A, and/or anchored to a support structure.

FIG. 6B illustrates an aerial perspective of the wind turbine blade support system of FIG. 6A. As shown, blade derivatives 602B may be rotated relative to adjacent blades or blade pairs to form a best fit that conforms to the contours of slope 604B. Blade derivatives 602B may be installed individually and/or coped with adjacent blade derivatives.

Figure 7A:
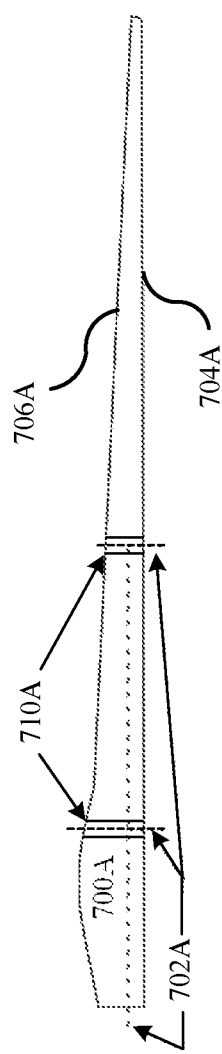
FIG. 7A illustrates sectioning of a wind turbine blade in an implementation.

FIG. 7A illustrates sectioning of a wind turbine blade 700A into derivative components in an implementation. For example, cylindrical and/or trough shaped structural derivatives may be generated by cutting wind turbine 700A along cut lines 702A. Depending on the shape, e.g., curves and twists, of wind turbine blade 700A, structural derivatives cut from leading edge 704A may be more uniform relative to each other than structural derivatives cut from trailing edge 706A.

Cutting wind turbine blade 700A into smaller components may increase the efficiency of transporting the repurposed blade. For example, transporting a fully intact wind turbine blade may take serval months to a year of advanced route planning, e.g., to accommodate the turning radius of a tractor trailer that can haul a load having a length of over 350 feet. When the wind turbine blade is cut into derivatives that can be transported by a normal sized tractor trailer, e.g., lengths of 48 ft or less, geographical application is no longer limited, and the transportation costs are far reduced as the decommissioned blades can travel over most roadways including roadways in most urban areas. In addition, cutting blade 700A into derivative components provides the added benefit of transporting multiple derivative components on a single trailer, nested as a single unit and/or as multiple stacked components of the same bade section.

Figure 10A:
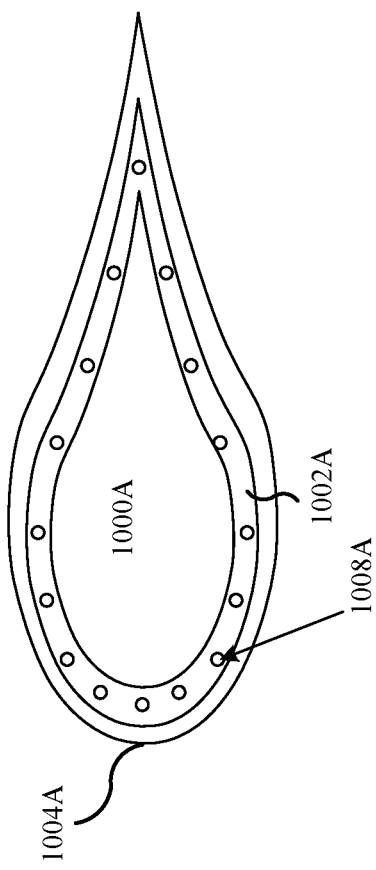
FIG. 10A illustrates a wind turbine blade in an implementation.
Figure 10B:
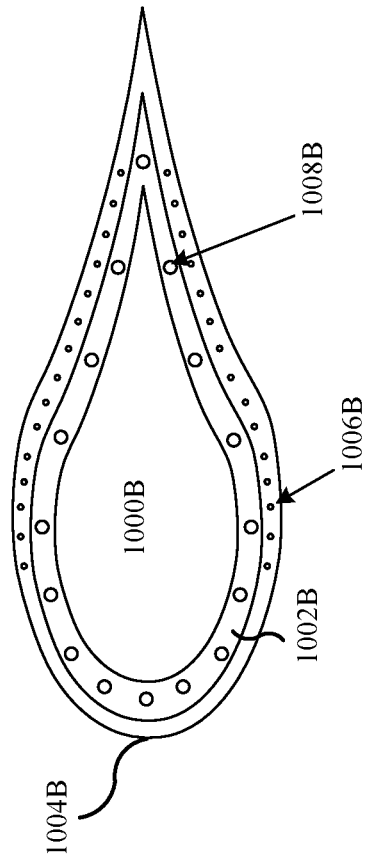
FIG. 10B illustrates a wind turbine blade in an implementation.

In an implementation, wind turbine blade 700A may be constructed with internal bulkhead ribs, e.g., ribs 710A, located below, above, and/or adjacent to a potential future cut line. Ribs 710A may provide a means for attaching derivative components to other structures, e.g., external flanges at the root of the blade, anchors, etc. For example, Ribs 710A may comprise holes, e.g., in the orthogonal direction, for attaching adjacent sections to each other and/or connections, e.g., as illustrated in FIGS. 10A and 10B. In an embodiment, rib 710A may provide a means for securing an endcap to a derivative component such that the endcap would protect the cut end from degradation, e.g., from the elements.

Ribs 710A may also provide structural support near the cut for load carrying capacity. The structural integrity of a wind turbine blade 700A may be reduced in response to cutting wind turbine blade 700A into trough sections, e.g., by cutting the midspan along a line running from the root end to the tip end. Installing ribs 710A may provide structural reinforcement at the cut site. Ribs 710A may be constructed from lightweight materials such as aluminum, composites, and the like. Ribs 710A may also provide pass through holes for electrical lines, telecommunication lines, and/or tubing for fluid or gas transportation.

Figure 7B:
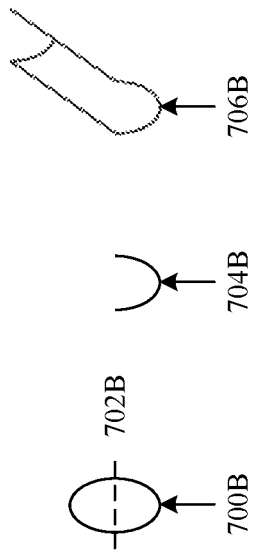
FIG. 7B illustrates sectioning of a wind turbine blade in an implementation.

FIG. 7B illustrates sectioning of a wind turbine blade 700B in an implementation. For example, structural components 704B and 706B may be generated by cutting wind turbine blade 700B along cutline 702B. Wind turbine blade 700B may include bulkhead ribbing adjacent to and/or on either side of cutline 702B. Structural components 704B and 706B may be cut from the leading edge of blade 700B and/or the trailing edge of blade 700B.

In an embodiment, structural components 704B and 706B may be used in bridge construction, e.g., as a bridge support, decking, and the like.

In an implementation, structural components 704B and 706B may be filled with cement or other structural mixture, e.g., to increase load capacity, to create a uniform thermal profile, to create a flat surface for attachment of structures or road surfaces, etc. Alternatively, structural components 704B and 706B may be filled with soil and/or other growing medium as may be necessary to construct a vegetated retaining wall.

Figure 7C:
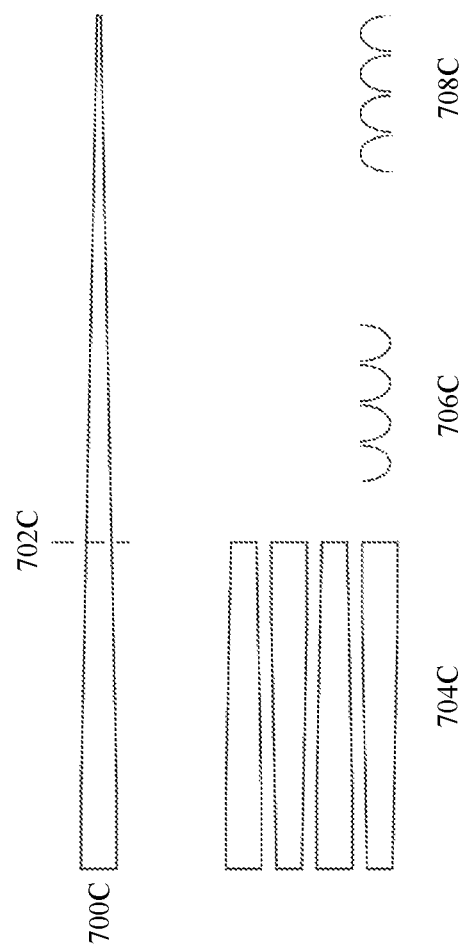
FIG. 7C illustrates sectioning of a wind turbine blade in an implementation.

FIG. 7C illustrates sectioning of a wind turbine blade 700C in an implementation. Blade 700C may be cut along cut line 702C to generate structural components. Because blade 700C has a taper along its leading edge, e.g., from its root end to its tip end, the structural components may also be tapered.

In an implementation, tapered structural components may be alternated to create structural floor 704C. Structural floor 704C may be oriented with the trough opening facing skyward, e.g., structural floor 706C, or with the trough bottom facing skyward, e.g., structural floor 708C.

FIG. 8A illustrates a top view of a wind turbine blade arrangement as bridge ribbing structure 800A. Bridge support structure 800A comprises end supports 802A and 804A and wind turbine derivatives 806A, 808A, 810A, and 812A. Wind turbine derivatives may be anchored into end supports 802A and 804A, which may be positioned as needed along blade sections 806A, 808A, 810A, and 812A, e.g., near root ends, tip ends, and/or anywhere within the mid-span of the blade section. In an embodiment, wind turbine derivatives 806A, 808A, 810A, and 812A may overhang end supports 802A and 804A.

In an embodiment, bridge support structure 800A may be created from structural components 704B and 706B, as illustrated in FIG. 7B, and may be oriented in accordance with structural floors 706C and/or 708C, as illustrated in FIG. 7C.

In an embodiment, wind turbine derivatives 806A-812A are alternated such that the straight cut is parallel to the bridge and/or roadway (not shown).

FIG. 8B illustrates a cross-sectional view of a wind turbine blade arrangement as depicted in FIG. 8A. Specifically, a cross-sectional view of end support 804A of FIG. 8B is illustrated. In this embodiment, blade sections 806B and 810B have a narrower cross-sectional area than blade sections 808B and 812B. The difference in cross-sectional area reflects the tapering of the blade sections at end support 804A and alternation of the blade sections.

FIG. 8C illustrates a side view of a wind turbine blade arrangement in an implementation as bridge support structure 800C. Bridge support structure 800C comprises bridge decking 802C; bridge ribbing structure 800A, as depicted in FIG. 8A; and bridge piers 806C. Bridge decking 802C may comprise concrete, composite materials, and the like. Bridge decking 802C may be fastened to bridge ribbing structure 800A. Bridge decking 802 may be joined with roadway 808C and/or roadway 810C.

Bridge piers 806C may be anchored to footings, embedded into earthen material, and the like. Bridge ribbing structure 800A may be fastened and/or otherwise coupled to bridge piers 806C.

Figure 9A:
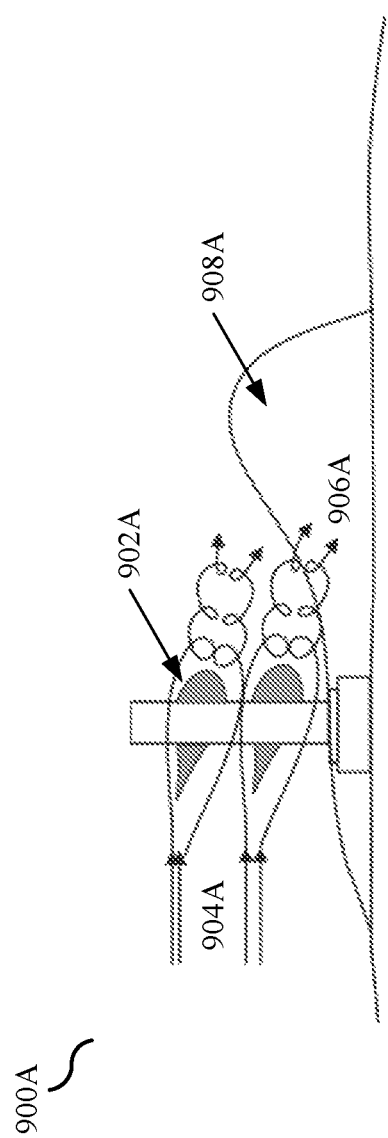
FIG. 9A illustrates a wind turbine blade arrangement in an implementation.

FIG. 9A illustrates a wind turbine blade arrangement 900A in which blade derivatives 902A are installed to mitigate material flows 904A, e.g., wind, snow, etc. In an embodiment, blade derivatives 902A are installed with trailing edges pointing upwind and leading edges pointing downwind in a reversed orientation that may increase turbulence of the wind flow and/or the wake after the airfoil. Unlike an airplane wing where it may be assumed that the wind speed is constant down the length of the airfoil, the airspeed down the length of a wind turbine blade, e.g., blade derivatives 902A, increase from the root end. The twist of the turbine blade accounts for the speed difference and results in different loads at different ends of the blade.

In an implementation, blade derivatives 902A may be rotated to divert wind and/or snow flows down or up to direct the flow into a specification direction or location, e.g., flow 906A. Snowbank 908A may form as a result of generating flow 906A by rotating blade derivatives 902A.

Figure 9B:
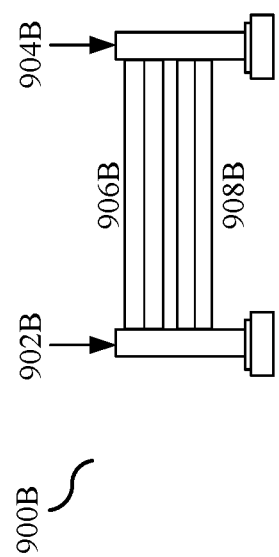
FIG. 9B illustrates a wind turbine blade arrangement in an implementation.

FIG. 9B illustrates a wind turbine blade arrangement 900B. In an embodiment, root ends of wind turbine blades may be used as end supports 902B and 904B. Blade derivatives 906B and 908B may be anchored into end supports 902B and 904B, which may be positioned anywhere along blade derivatives 906B and 908B. Flanges of the root ends may be used to bolt end supports 902B and 904B to a footing, foundation, or other anchoring structure.

Figure 9C:
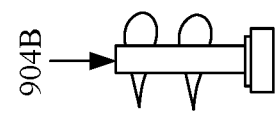
FIG. 9C illustrates a wind turbine blade arrangement in an implementation.

FIG. 9C illustrates a cross-sectional view of wind turbine blade arrangement 900B, as illustrated in FIG. 9B. Specifically, a side view of end support 904B of FIG. 9B is illustrated.

FIG. 10A illustrates a wind turbine blade 1000A in an implementation. Blade 1000A may include bulkhead ribbing 1002A, composite skin 1004A, and connectors 1008A. Bulkhead ribbing 1002A may be mounted to blade 1000A via composite skin 1004A. For example, bulkhead ribbing 1002A may be fastened to composite skin 1004A, e.g., via glue, epoxy, fasteners, etc. Alternatively, bulkhead ribbing 1002A may be incorporated into composite skin 1004A. In an embodiment, bulkhead ribbing 1002A may provide structural support to derivative components of blade 1000A, e.g., after blade 1000A has been decommissioned.

In an implementation, bulkhead ribbing 1002A may provide a fastening means, e.g., connectors 1008, that may be used to connect, couple, and/or anchor derivative components of blade 1000A in the embodiments disclosed herein in FIGS. 2A-9C. Connectors 1008A may include unthreaded holes, threaded holes, fasteners, and/or other connecting means. Holes may be drilled into the outer layers of composite skin 1004A, e.g., to access connectors 1008A.

FIG. 10B illustrates a wind turbine blade 1000B in an implementation. Blade 1000B may include bulkhead ribbing 1002B, composite skin 1004B, plies 1006B, and connectors 1008B. Bulkhead ribbing 1002B may be mounted to blade 1000B via composite skin 1004B. For example, bulkhead ribbing 1002B may be fastened to composite skin 1004B, e.g., via glue, epoxy, fasteners, etc. Alternatively, bulkhead ribbing 1002B may be incorporated into composite skin 1004B. In an embodiment, bulkhead ribbing 1002B may provide structural support and/or fastening means, e.g., connectors 1008B, to derivative components of blade 1000B.

In an implementation, composite ply, e.g., plies 1006B, may be added to blade 1000B to accommodate future loadings that may not be supported by the ply orientation required by blade 1000B during power generation. In an implementation, blade 1000B may be commissioned comprising ply orientations and/or materials in excess of the needs of power generation for the purpose of an alternative use of blade 1000B and/or its components after blade 1000B is decommissioned. While inclusion of the excess materials, e.g., plies 1006B, may affect the performance of blade 1000B during power generation, they may be incorporated in a way to enhance the performance of blade 1000B.

In an alternative implementation, connectors 1008B may be used to pass utilities, e.g., electrical lines, communication lines, sensors to detect deflection, tubes for transporting electrical, liquid materials, and/or gas materials, and the like. The sizing of connectors 1008B may vary depending, e.g., on the type and/or amount of utility passing through.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of soil stabilization comprising: placing a portion of a wind turbine blade against an earthen slope in a direction that prevents lateral flow of earthen material, wherein the portion of the wind turbine blade comprises bulkhead ribbing adjacent to a cutline; and anchoring the portion of the wind turbine blade to the earthen slope to prevent the lateral flow of earthen material.

2. The method of claim 1 further comprising cutting the portion of the turbine blade to match a contour of a portion of another turbine blade.

3. The method of claim 2 further comprising installing filler material between the portion of the turbine blade and the portion of the other turbine blade.

4. The method of claim 3, wherein the filler comprises fragments of a wind turbine blade.

5. The method of claim 1, wherein anchoring the portion of the turbine blade to the earthen slope comprises securing the portion of the turbine blade to a support structure.

6. The method of claim 5, wherein the support structure comprises at least one of a masonry system, a cable anchoring system, and a fastening system.

7. The method of claim 1 further comprising installing conduit through the portion of the turbine blade.

8. An apparatus of soil stabilization comprising: a portion of a wind turbine blade having a leading edge, a trailing edge, and a midspan located between the leading edge and the trailing edge, wherein the portion of the wind turbine blade comprises a bulkhead ribbing adjacent to a cutline; and an anchor operatively coupled to the portion of the wind turbine blade, wherein the anchor is configured to maintain a position of the portion of the wind turbine blade that prevents lateral flow of earthen material.

9. The apparatus of claim 8 further comprising a portion of another turbine blade cut along the midspan and fastened against the portion of the turbine blade.

10. The apparatus of claim 8, wherein the bulkhead ribbing comprises a connector for coupling the portion of the turbine blade to a second portion of a turbine blade.

11. The apparatus of claim 8, wherein the bulkhead ribbing comprises a connector for coupling the portion of the turbine blade.

12. The apparatus of claim 8, wherein the bulkhead ribbing comprises a connector for transporting one or more utilities through the portion of the turbine blade.

13. The apparatus of claim 12, wherein the one or more utilities include at least one of an electrical utility, a telecommunications utility, and a gas utility.

14. The apparatus of claim 8, wherein the anchor comprises a masonry support tower.

15. A method of land building comprising: connecting, to a support structure comprising a support tower, a plurality of wind turbine blade sections generated from one or more wind turbines, wherein the support tower is configured to maintain a position of the plurality of wind turbine blade sections that prevents lateral flow of earthen material and wherein each of the plurality of wind turbine blade sections comprises a bulkhead ribbing adjacent to a cutline; and placing the earthen material behind the wind turbine blade section.

16. The method of claim 15, further comprising installing filler material between the plurality of blade sections.

17. The method of claim 15, wherein the bulkhead ribbing comprises a connector for coupling a blade section of the plurality of blade sections to a second blade section of the plurality of blade sections.

18. The method of claim 15, wherein the bulkhead ribbing comprises a connector for coupling the plurality of blade sections to the support structure.

19. The method of claim 15, wherein the bulkhead ribbing comprises a connector for transporting one or more utilities through the plurality of blade sections.

20. The method of claim 19, wherein the one or more utilities include at least one of an electrical utility, a telecommunications utility, and a gas utility.

* * * * *